United States Patent
Andersen et al.

(10) Patent No.: US 9,695,058 B2
(45) Date of Patent: Jul. 4, 2017

(54) VENT LINE FOR USE IN AMMONIA AND HYDROGEN PLANTS

(71) Applicant: Haldor Topsøe A/S, Kgs. Lyngby (DK)

(72) Inventors: Niels Ulrik Andersen, Gentofte (DK); Christian Speth, Lynge (DK)

(73) Assignee: Haldor Topsøe A/S, Lyngby (DK)

( * ) Notice: Subject to any disclaimer, the term of this patent is extended or adjusted under 35 U.S.C. 154(b) by 0 days.

(21) Appl. No.: 14/786,062

(22) PCT Filed: Apr. 16, 2014

(86) PCT No.: PCT/EP2014/057768
§ 371 (c)(1),
(2) Date: Oct. 21, 2015

(87) PCT Pub. No.: WO2014/180641
PCT Pub. Date: Nov. 13, 2014

(65) Prior Publication Data
US 2016/0145113 A1    May 26, 2016

(30) Foreign Application Priority Data

May 10, 2013   (DK) .................. 2013 00283

(51) Int. Cl.
*C01C 1/04*     (2006.01)
*C01B 3/34*     (2006.01)
(Continued)

(52) U.S. Cl.
CPC ............ *C01C 1/04* (2013.01); *B01J 19/0013* (2013.01); *C01B 3/025* (2013.01); *C01B 3/34* (2013.01);
(Continued)

(58) Field of Classification Search
CPC ....... C01C 1/0417; C01C 1/0447; C01C 1/04; C01B 3/025; C01B 3/34; C01B 3/48; C01B 2203/0211; C01B 2203/16; C01B 2203/0475; C01B 2203/068; C01B 2203/0283; C01B 2203/147;
(Continued)

(56) References Cited

U.S. PATENT DOCUMENTS

| 5,110,559 A | 5/1992 | Kondo et al. |
| 2003/0072978 A1 | 4/2003 | Meyer et al. |

(Continued)

OTHER PUBLICATIONS

Peter Haussinger, et al., "Hydrogen, 3 Purification", Ullmann's Encyclopedia of Industrial Chemistry, 2012, pp. 309-333, vol. 18, Wiley-VCH Verlag GmbH & Co. KGaA, Weinheim.

*Primary Examiner* — Lessanework Seifu
(74) *Attorney, Agent, or Firm* — Blank Rome LLP

(57) ABSTRACT

In an ammonia or hydrogen plant comprising a desulfurisation section, a reforming section and a shift section, where the shift section comprises a low temperature shift converter and a medium temperature shift converter, a vent line is arranged downstream from the low temperature shift converter and the medium temperature shift converter in order to allow the shift converters to be re-heated with process gas at a low pressure (typically 3-7 bar). This way condensation of water vapour in the process gas is avoided. By applying this vent line it becomes possible to save significant time, more specifically 8-24 hours, for restarting the production after temporary shut-down thereof, because a heat-up of the LTS/MTS converter in circulating nitrogen is avoided.

3 Claims, 1 Drawing Sheet

(51) Int. Cl.
*B01J 19/00* (2006.01)
*C01B 3/02* (2006.01)
*C01B 3/48* (2006.01)

(52) U.S. Cl.
CPC ........ *C01B 3/48* (2013.01); *C01B 2203/0211* (2013.01); *C01B 2203/0233* (2013.01); *C01B 2203/0283* (2013.01); *C01B 2203/0288* (2013.01); *C01B 2203/047* (2013.01); *C01B 2203/0475* (2013.01); *C01B 2203/068* (2013.01); *C01B 2203/142* (2013.01); *C01B 2203/147* (2013.01); *C01B 2203/16* (2013.01); *C01B 2203/1604* (2013.01); *C01B 2203/1638* (2013.01)

(58) Field of Classification Search
CPC ...... C01B 2203/047; C01B 2203/1604; C01B 2203/1638; C01B 2203/0233; C01B 2203/0288; C01B 2203/142; B01J 19/0013
See application file for complete search history.

(56) References Cited

U.S. PATENT DOCUMENTS

| | | |
|---|---|---|
| 2003/0087138 A1 | 5/2003 | Margiott et al. |
| 2006/0063047 A1 | 3/2006 | Margiott et al. |

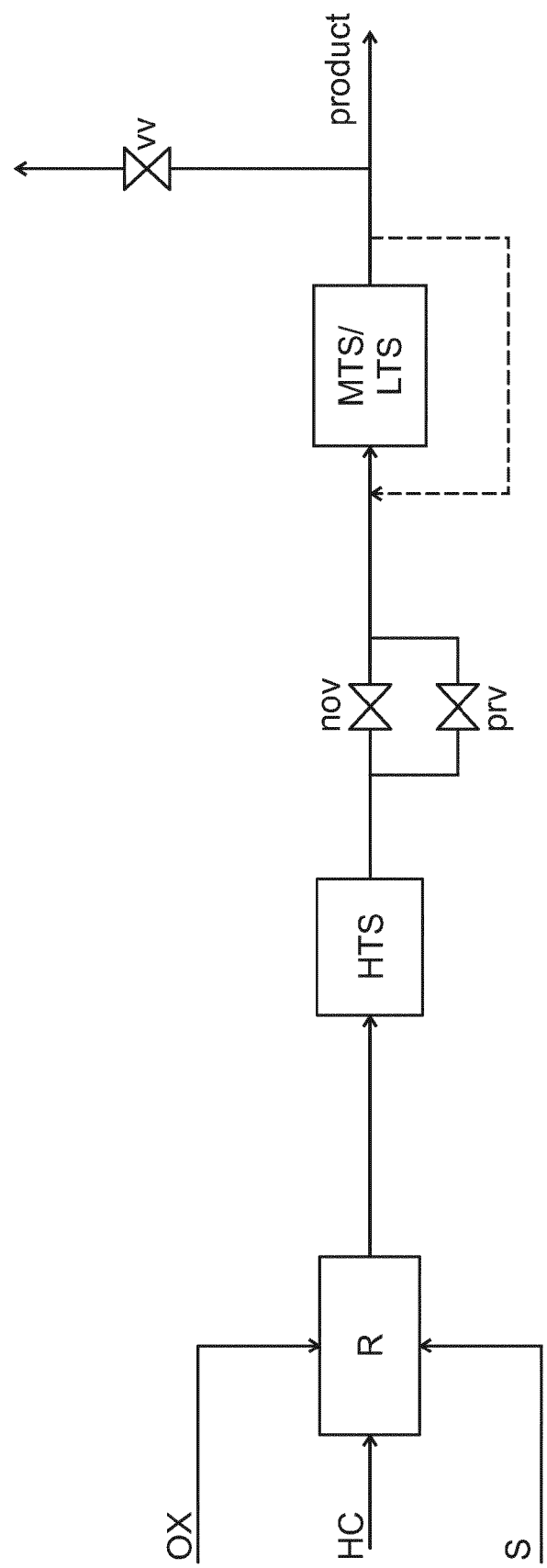

VENT LINE FOR USE IN AMMONIA AND HYDROGEN PLANTS

The present invention relates to a vent line for use in ammonia and hydrogen plants, said vent line being arranged downstream from the shift section of the plant. More specifically, the invention concerns the synthesis gas generation part of an ammonia or hydrogen plant, which comprises a reforming section, a shift section, a carbon dioxide removal unit and a methanator, said shift section comprising a low temperature shift converter and/or a medium temperature shift converter. The plant is characterised by a vent line being arranged downstream from the low temperature shift converter and/or the medium temperature shift converter, said vent line allowing the shift converter(s) to be re-heated with process gas at a low pressure (typically 3-7 bar), and by an inlet pressure reducing valve and a vent valve, said valves facilitating the pressure control, thereby controlling the dew point in the MTS and/or the LTS catalyst. Further, the invention concerns the use of the vent line in an ammonia or hydrogen plant for easy and time-saving re-starting of production after temporary shut-down thereof.

The synthesis gas generation part of an ammonia plant as well as of a hydrogen plant roughly consists of a desulfurization section, such as a hydrodesulfurisation (HDS) section (necessary in order to avoid poisoning of catalyst in the downstream steam reformer), a reforming section, a shift section, a carbon dioxide removal unit, a methanator and an ammonia synthesis unit. The reforming section can for example be based on a tubular reformer preceded by a pre-reformer. The pre-reformer is used for low temperature steam reforming of a hydrocarbon feed such as natural gas. It provides complete conversion of higher hydrocarbons and removal of sulfur and it is also protecting the downstream catalyst.

The pre-reformer is placed upstream from the tubular reforming unit. In order to obtain the required steam-to-carbon ratio, the feed is mixed with process steam before entering the pre-reformer. In the pre-reformer, all higher hydrocarbons are converted into a mixture of carbon oxides, hydrogen and methane.

In an ammonia plant the carbon monoxide conversion unit is located downstream from the secondary reformer.

The purpose of the shift section is to maximise the hydrogen output and reduce the carbon monoxide level in the synthesis gas.

In an ammonia plant, the shift section normally consists of a high temperature shift (HTS) reactor followed by a low temperature shift (LTS) reactor. The shift section may optionally consist of a medium temperature shift (MTS) reactor followed by a low temperature shift (LTS) reactor. To ensure that the synthesis gas in an ammonia plant being fed to the ammonia synthesis loop is free from carbon oxides, it is passed through a methanator, which will convert any traces of carbon dioxide and unconverted carbon monoxide from the shift section into methane.

The performance of the shift unit strongly affects the overall energy efficiency of the ammonia plant, because unconverted carbon monoxide will consume hydrogen and form methane ($CH_4$) in the methanator, thereby reducing the feed and increasing the inert gas level in the synthesis loop.

In a hydrogen plant, the shift section normally consists of a medium temperature shift (MTS) reactor and optionally a low temperature shift (LTS) reactor. The synthesis gas is typically purified in a pressure swing adsorption (PSA) unit, and any unconverted carbon monoxide (CO) will end in the off-gas of the PSA unit. Normally it is separated off and used as fuel rather than being used directly for hydrogen production.

Plants producing hydrogen are disclosed in several patent documents. For instance, US 2003/0087138 A1 relates to a fuel cell system including fuel processing components, such as a desulfurisation section, a reforming section and a shift section with a vent line located downstream of the shift section. However, the vent line is used only during shut-down of the system, where the fuel cell is disconnected from its load and the fuel processing components are purged of residual hydrogen with a flow of air. Likewise, US 2003/0072978 A1 describes a procedure for purging a fuel cell system during start-up or shut-down. The purge gases from the fuel processing system are ultimately vented to the atmosphere by means of a vent line, but there is not mentioned any re-heating at low pressure in process gas. Finally, US 2006/0063047 A1 discloses a fuel cell power plant which is used as a reformate generator in addition to conventionally producing electricity and heat. This plant, however, does not comprise a vent line.

The basic idea underlying the present invention is to have a vent line arranged downstream from the low temperature shift converter and/or the medium temperature shift converter in an ammonia or hydrogen plant as indicated in the FIGURE. The reason for this arrangement is the following:

After a short (possibly unplanned) shut-down of the plant, the medium temperature shift (MTS) and/or low temperature shift (LTS) catalyst may only have cooled slightly down, i.e. to 140-250° C. MTS and LTS catalysts do not tolerate condensing steam, so these catalysts must be heated well above the dew point of the syngas before being exposed to the syngas.

An example of the synthesis gas from a tubular reformer in a hydrogen plant is given in Table 1 below.

TABLE 1

| Synthesis gas from reforming section | |
|---|---|
| steam-to-carbon (S/C) ratio in reformer | 2.5 |
| reformer outlet temperature | 800° C. |
| reformer outlet pressure | 28.3 $kg/cm^2 \cdot g$ |

The invention involves admitting a part of the synthesis gas stream into the MTS and/or LTS catalyst, more specifically at a reduced pressure. This is done by having an inlet pressure reducing valve and a vent valve facilitating the pressure control, thereby controlling the dew point in the MTS and/or LTS catalyst.

Examples of the dew point of the synthesis gas at reduced pressure are indicated in Table 2:

TABLE 2

| synthesis gas pressure | synthesis gas dew point |
|---|---|
| 27 $kg/cm^2 \cdot g$ | 177° C. |
| 5 $kg/cm^2 \cdot g$ | 121° C. |

The FIGURE illustrates both the closest prior art and the vent line according to the present invention. The desulfurised hydrocarbon feed (HC) is led to the reforming section (R) together with process steam (s). Optionally an oxidant (ox), which can be air, enriched air or pure oxygen, is led to the reforming section too. From the reforming section the synthesis gas product is sent to the MTS and/or LTS section, optionally after passing a high temperature shift (HTS) reactor.

In the prior art, a nitrogen start-up circulation is established around the MTS and/or LTS section to be used after shut-down of the plant. This circulation of $N_2$ (shown as a dotted arrow) to heat the MTS and/or LTS catalyst can be avoided by applying the vent line according to the invention. This way the MTS and/or LTS converter(s) is/are reheated in synthesis gas at a reduced pressure (typically 3-7 bar), whereby condensation of water vapour in the process gas is avoided. As mentioned, the use of a vent line is relevant after a trip (possibly unplanned) of the plant or converter of a relatively short duration, in which case the catalyst has only been slightly cooled, i.e. to 140-250° C.

If the hydrocarbon feed gas is submitted at a normal operating pressure, then water condensation will occur, and water condensation will damage the LTS and/or MTS catalyst.

The reduced pressure needed when the synthesis gas stream enters into the MTS and/or LTS catalyst is established by means of an inlet pressure reducing valve (prv) and a vent valve (vv). These valves are normally closed, and the synthesis gas is led to the MTS and/or LTS section through the normally open valve (nov). When applying the vent line, the normally open valve (nov) is closed and the inlet pressure reducing valve (prv) and the vent valve (vv) are opened. This way the pressure control is facilitated, thereby controlling the dew point in the MTS and/or LTS catalyst.

By applying the vent line according to the invention, it is possible to save significant time, more specifically 8-24 hours, for re-starting the production after temporary shut-down thereof. This is because heating up the LTS and/or MTS converter in circulating nitrogen is avoided.

The invention claimed is:

1. An ammonia or hydrogen plant including a synthesis gas generation part comprising a reforming section, a shift section, a carbon dioxide removal unit and a methanator, said shift section comprising a low temperature shift (LTS) converter and/or a medium temperature shift (MTS) converter, and further including a vent line arranged downstream from the shift section comprising the LTS converter and/or the MTS converter, said vent line allowing the shift converter(s) to be re-heated with process gas at a pressure of 3 to 7 bar, and an inlet pressure reducing valve placed at the inlet of the shift section and a vent valve placed in the vent line downstream from the shift section, said valves facilitating the pressure control.

2. An ammonia or hydrogen plant according to claim 1, wherein the reduced pressure is established by means of an inlet pressure reducing valve and a vent valve, said valves normally being closed and the synthesis gas being led to the MTS and/or LTS section through a normally open valve.

3. A process of using the vent line in the plant of claim 1, comprising opening a normally closed valve of the vent line and conveying process gas at a pressure of between 3-7 bar from said vent line to said shift section, upstream of the low temperature shift (LTS) converter and/or a medium temperature shift (MTS) converter, to restart the plant after temporary shut-down thereof, where the catalyst has only cooled slightly down, to a temperature of 140-250°.

* * * * *